Nov. 29, 1955  G. E. CHADWICK ET AL  2,725,323
METHOD FOR THE MANUFACTURE OF FABRICS
Filed Feb. 23, 1951  5 Sheets-Sheet 4

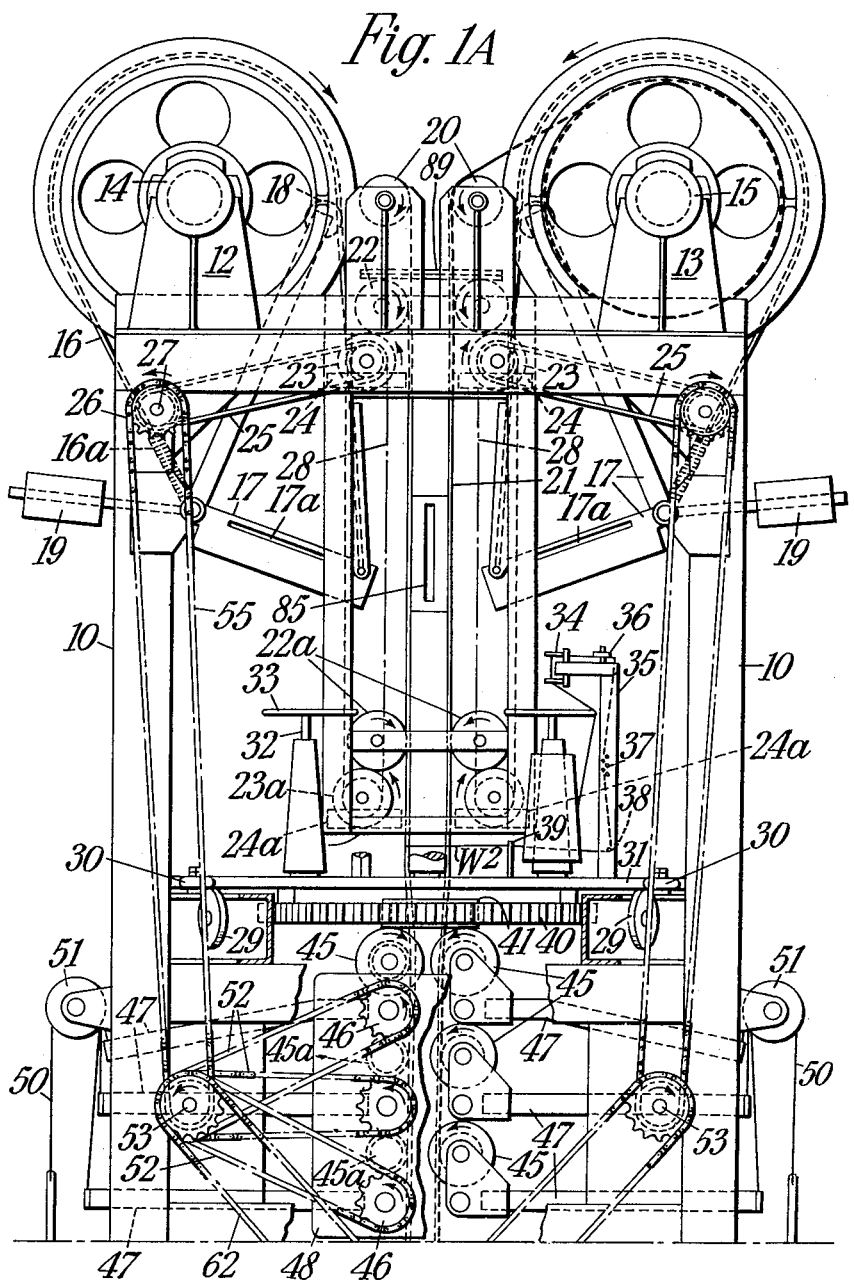

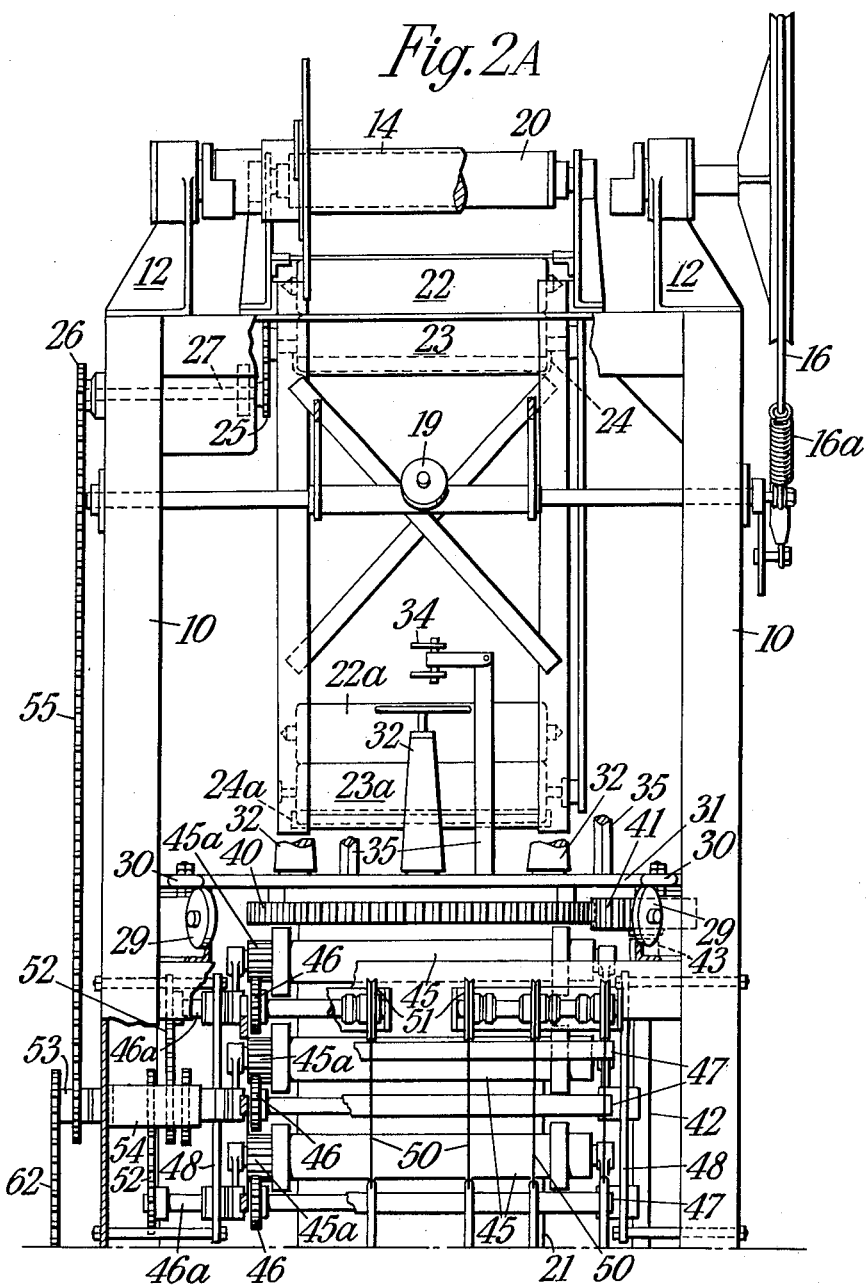

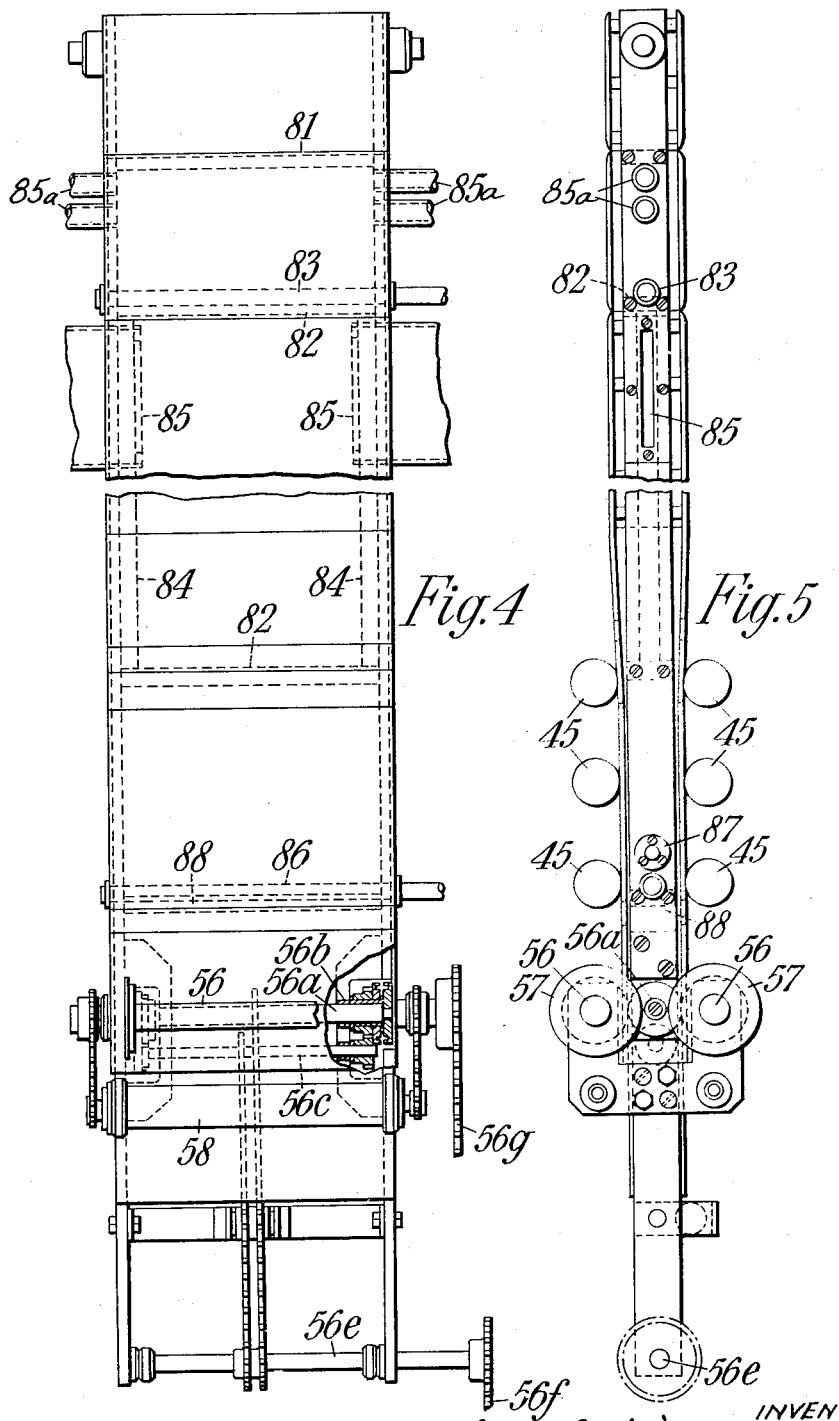

2,725,323
Patented Nov. 29, 1955

2,725,323

METHOD FOR THE MANUFACTURE OF FABRICS

George Ernest Chadwick, George Ernest Collins, and William John Roff, Didsbury, Manchester, England, assignors to The British Cotton Industry Research Association, Didsbury, England, a British association Application February 23, 1951, Serial No. 212,362

Claims priority, application Great Britain February 23, 1950

6 Claims. (Cl. 154—90)

The present invention is concerned with the manufacture of non-woven fabrics and has for its object the production of a fabric closely resembling a woven textile fabric but without involving any weaving or similar operation to interlace the threads or filaments.

It is known to impregnate with resin or other adhesive material a web or superimposed webs of fibres, unorientated or otherwise, with a view to producing a fibrous sheet of material for use as a fabric or, more particularly, as a reinforcement in laminated plastics.

The present invention is based upon the discovery that it is possible to produce a non-woven fabric resembling a woven textile fabric, but having certain advantages over both woven fabrics and impregnated webs aforesaid.

The term "textile thread" is used herein to include single continuous filaments, groups of parallel or twisted filaments, spun and/or folded and/or cabled yarns, slivers and rovings.

The term "bonded" is used herein to include the method of bonding by fusion or welding produced by the use of heat or pressure or solvent, or by the use of a suitable adhesive, or by a combination of any of the methods aforesaid.

The invention comprises the method of manufacture of a non-woven fabric (resembling a woven textile fabric), wherein textile threads are superimposed so as to provide at least two layers with the threads in each layer substantially parallel and with the threads of one layer in any directionally crossed relation to those of the adjacent layer, the threads of any one layer being bonded to those of at least one other adjacent layer.

In one embodiment of the invention, in the method aforesaid one layer of threads is laid on at least one other layer by a continuous wrapping operation involving no interlacing.

Preferably, one set of parallel textile threads (hereinafter termed weft-like threads) either singly or as a band is laid across a second set of textile threads (hereinafter termed warp-like threads), either orthogonally or at some other angle, and the threads of one set are bonded to the threads of the other set by means of a suitable adhesive. The choice of adhesives will depend upon the particular materials involved and process to be employed and the particular resultant properties required, and the adhesive may either be spun into the threads as fibres of the adhesive material, or be applied to one or both sets of the threads, either after laying the two sets together or previous to such laying. The incorporation of the adhesive may be assisted by the application of heat and/or pressure, as may the subsequent bonding of the yarns. The fabrics may be made by laying any number of sets of threads successively, which sets may either be bonded individually as they are laid or collectively after the laying of a number of sets.

The invention also includes apparatus for carrying out the method aforesaid.

The chief advantage of the present invention is a high production rate of material resulting from the elimination of the operations of shedding, picking, and beating-up normally involved in weaving, and also from the ability to lay simultaneously a larger number of threads than is ordinarily possible in a normal weaving process. Preliminary experiments carried out on the invention have shown that production rates of at least 50 inches per minute can be expected, a rate of production for fabrics of average closeness which is at least 20 times that obtainable by a normal weaving operation. There is also likely to be a saving in floor space required. Again, as compared with the weaving process, the threads employed need be neither so strong nor so resistant to abrasion, and the preparatory process of sizing is not necessary.

Fabrics produced according to our invention have already been shown to possess certain properties which render them useful for specific purposes: as a result of absence of crimp in the threads due to the absence of interlacing, the fabrics are remarkably stable dimensionally when subjected to tension or to a wetting process; the degree of stiffening when wetted is less than in a comparable woven fabric; properties such as stiffness, softness, and crease-resistance can be varied and controlled by the choice of suitable adhesive material; the fabrics have a smooth surface on both sides, and special lustre effects are possible; the fabrics are particularly good in respect of resistance to tearing and to repeated flexing. They have been dyed and printed satisfactorily and have been shown to withstand scouring, bleaching and laundering.

In the accompanying drawings:

Figs. 1A and 1B are the upper and lower parts of a rear elevation of one example of apparatus for the manufacture of non-woven fabric according to the invention.

Figs. 2A and 2B are similar views of a part-sectional side elevation of the machine shown in Fig. 1.

Figs. 4 and 5 are front and side views of the former shown in the other figures.

Figure 1B:
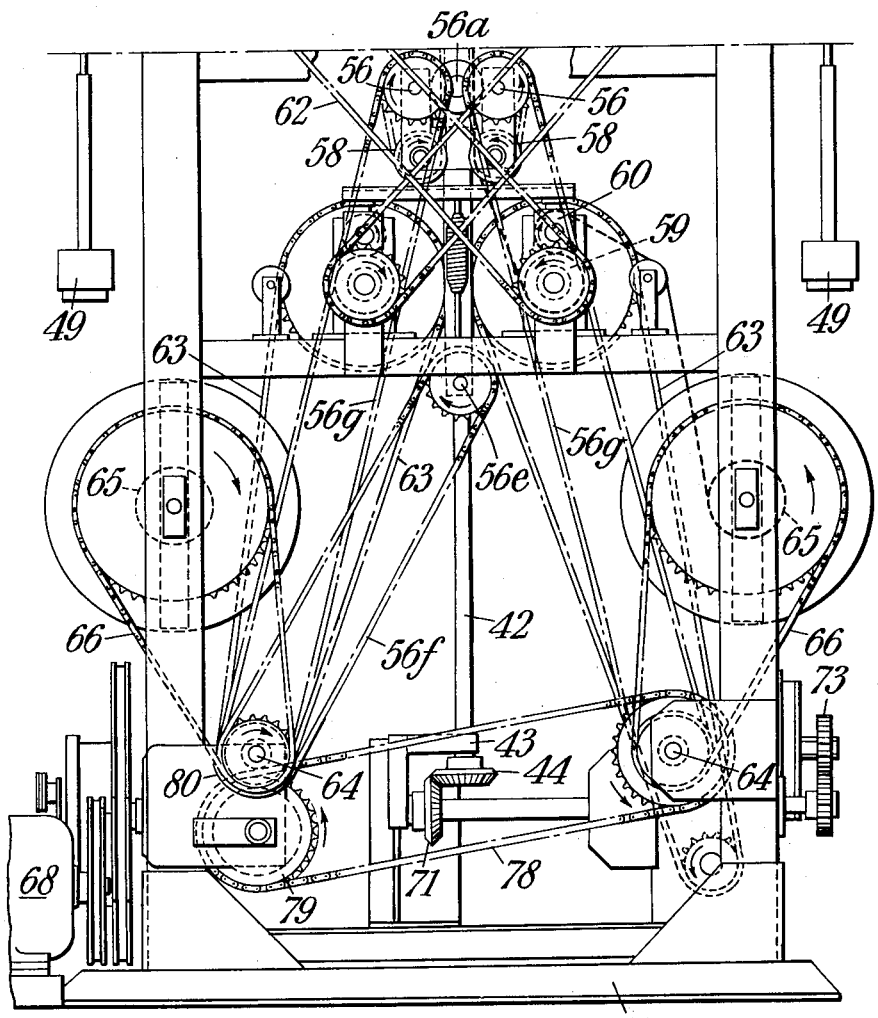
Figure 2B:
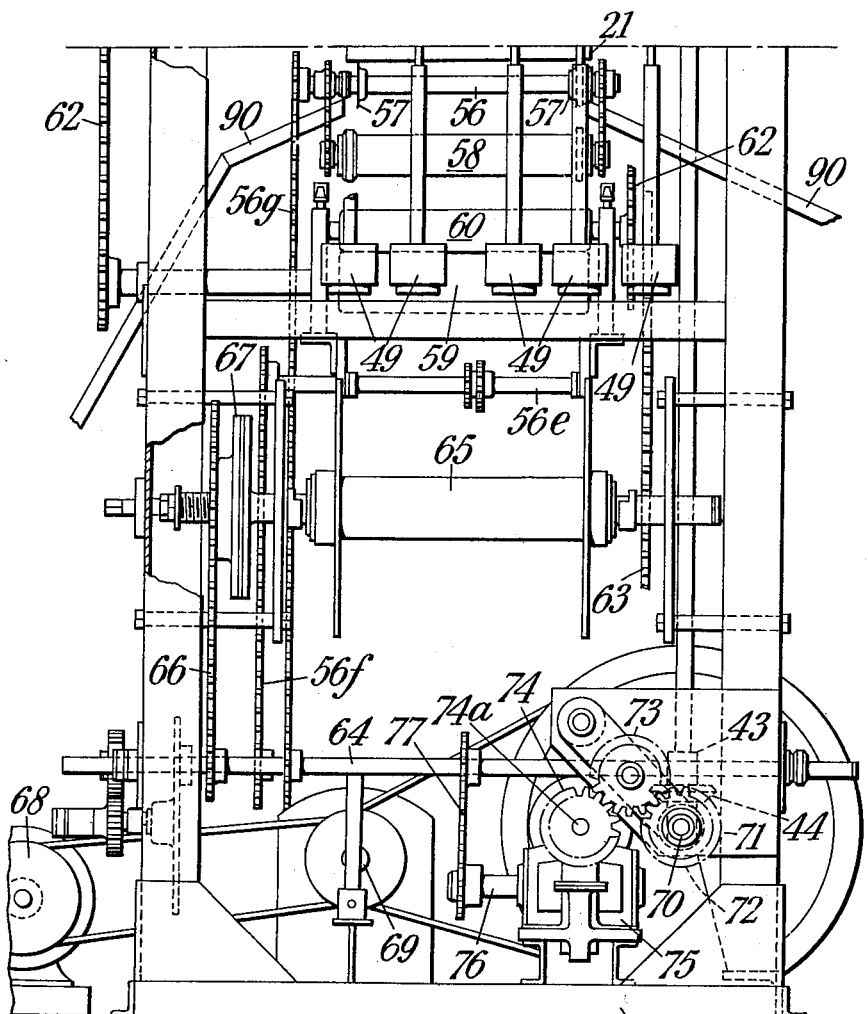

As shown in the drawings the machine comprises a superstructure 10 of girder construction mounted on a base 11, said superstructure having pairs of bearing brackets 12, 13 at its upper end adapted to hold warp beams 14, 15 each having let-off means consisting of a brake cable 16 and bell-crank lever 17. The lever has a roller 18 adapted to contact the warp on the beam so that the lever under the action of a weight 19, assumes a position proportional to the diameter of the warp on the beam. The cable 16 has a spring 16a at one end by which it is anchored at the pivot of the bell-crank lever and the other end of the cable is attached to the lower arm of the bell-crank lever by suitable means adjustably located in a slot 17a. Also mounted at the upper end of the superstructure are brackets carrying guide rollers 20 for the warp threads. Upstanding in the centre of the superstructure is a hollow former 21 of flat rectangular shape, the sides of which are adapted to receive the warp from the guide rollers 20. Associated with the upper end of such former are sets of rollers for the application of an adhesive to the warp, each set consisting of an application roller 22 supported on and adapted to be rotated by a pick-up roller 23 dipping into a bath 24. The rollers 23 are connected by driving chain 25 to a chain sprocket 26 on the end of a shaft 27 mounted in suitable bearings on the superstructure. Below the first set of adhesive applying rollers there is a second set of similar rollers 22a and 23a respectively, the latter dipping into a bath 24a and being driven by a driving chain 28 from the roller 23 above.

Rotatably mounted on the superstructure on bearing rollers 29 and between rim guide rollers 30 is an annular creel platform 31 carrying twelve equally spaced bobbin-carrying spindles 32, two only of which are shown to avoid hiding other parts. On the upper end of each spindle is a thread guide disc 33 associated with thread guides comprising guide eyes 34 immediately above each spindle carried by pillar 35 which also carries upper thread guides 36, tensioning pins 37 and lower yarn guide 38. The thread finally passes through a guide 39, carried by the creel platform, before wrapping onto the former, which is located through the centre of the creel. Attached to the underside of the creel is an annular gear ring 40 in mesh with a pinion 41 attached to the upper end of a vertical shaft 42 mounted in suitable bearing brackets 43 secured to the superstructure. On the lower end of the shaft is a bevel pinion 44.

Immediately below the creel are a series of heated pressure rollers 45, and for clarity in Fig. 1A those on the right hand side are shown without their driving system. Each roller 45 is geared by pinion 45a to a driving pinion 46 and is carried by a bell-crank lever arm 47 pivoted about the axis of the pinion 46. The shafts of the pinions 46 are journalled in bearing plates 48 attached to the superstructure. The outer end of each lever is loaded by a weight 49 and cable 50, the latter passing over a pulley 51 to urge the heated rollers 45 against the sides of the former. Each gear pinion shaft 46a is driven by driving chain 52 from a shaft 53 supported in a bracket 54 attached to the superstructure. The shaft 53 on each side of the machine is connected by driving chain 55 to the shaft 27 above it.

Below the heated rollers and as shown more clearly in Figs. 4 and 5 are mounted a pair of shafts 56 each carrying a pair of cutter discs 57 presented to the sides and located near the edges of the former. Between such shafts 56 and passing through the former is a third shaft 56a carrying two pairs of cutter discs one pair complementary to the cutter discs 57 on one shaft and another pair of cutter discs rotatably carried by bushes 56b complementary to the other pair of cutter discs 57. The bushes 56b are geared to a lower shaft 56c and the shafts 56a and 56c are connected by chain drive to a further shaft 56e the latter being driven by chain 56f from one of the shafts 64. The shaft 56 is also driven by chains 56g from the two shafts 64. Below each cutter shaft is a guide roller 58. Further below each guide roller is a system of take-up rollers consisting of a main roller 59 over which is a nip roller 60 loaded by a spring 61. Each of such main rollers is connected by driving chain 62 to the shaft 53 on the other side of the machine above it and by driving chain 63 to a main driving shaft 64 below it near the base of the machine.

At each side of the machine is a batching or cloth roller 65 driven by chain 66 from the shaft 64 through a slipping clutch 67.

The machine is driven from an electric motor 68 through V-belt drive to a countershaft 69 and through a second V-belt drive to a shaft 70. On the shaft 79 is a bevel pinion 71 complementary to the bevel pinion 44 on the vertical shaft 42 for driving the creel. The shaft 70 through gear pinions 72, 73 and 74 is coupled to the input shaft 74a of a variable speed reduction gear box 75 the output shaft 76 of which is coupled by driving chain 77 to one of the shafts 64. The other shaft 64 is coupled to the first shaft 64 through driving chain 78 and gear wheels 79, 80 for rotation in the opposite direction.

The former or platen as shown in detail in Figs. 4 and 5 is of hollow rectangular cross section and a closed compartment is formed at its upper end by an upper partition 81 and a lower partition 82. In the lower part of such compartment is a tubular gas burner 83 and in the upper part are flue vents 85a. This provides a heated section for the drying of adhesive applied to the warps by the upper set of adhesive applying rollers 22. Below the partition 82 the inner wall of the former is lagged with heat insulating material 84 against all faces down to a position below the creel to form a relatively cool section, there being a pair of flue outlets 85a at the upper end. Below the lagging 84 is a further heated section, heat being provided by tubular burners 86 accessible for lighting and inspection through vent holes 87. Such heated section is closed at its lower end by a partition 88.

In order to keep the warp threads correctly spaced they are passed through a reed 89 after leaving the guide rollers 20.

In operation, the warp-like threads w are pulled from or let off the beams and pass down each wide face of the former and in doing so they first have applied to them a suitable adhesive which is dried on the warps as they pass over the upper heated section defined by the partitions 81, 82. Before reaching the creel, the warp threads receive a second application of adhesive but whilst still wet, the weft-like threads w' are wrapped on to the former by the creel so as to lie across and be carried down by the warps. Thereafter, the warp-like threads with the weft-like threads lying across them, reach the upper end of the lower heated section and pass under the first pair of heated rollers 45, so that while heated from both sides the threads are pressed and bonded together. It may be noted that just before reaching the first roller the former is slightly tapered, the tension in the transverse or weft-like threads being thereby reduced. After passing under the second and third heated rollers 45, the crossing threads have been effectively bonded into a cloth and pass to the cutters which sever the weft threads and form two lengths of cloth, one from each wide face of the former. The waste portions of weft from around the edges of the former pass into waste chutes 90. The cloth then passes around the take-up rollers 60, 59 and onto the batching rollers 65.

Obviously, the variable speed gear 75 enables the rate of movement of the warp threads to be altered relative to the speed of rotation of the creel to vary the spacing of the weft-like threads.

Figure 3:
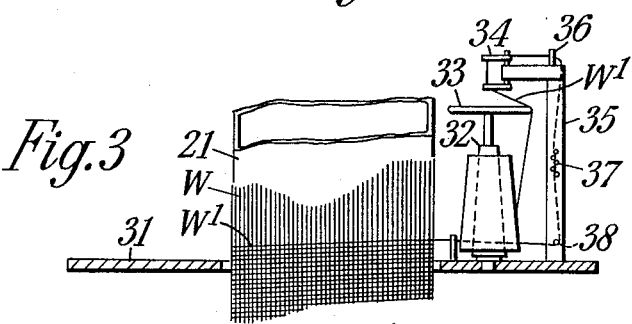
Fig. 3 is a diagrammatic view showing the laying of the weft-like threads onto the layer of warp-like threads.

Further, in the diagram Fig. 3 one of the threads is shown darker to indicate the pitch or band-like nature of the weft-threads applied by the creel.

What we claim is:

1. A method of manufacturing a non-woven fabric consisting of an assembly of layers of longitudinal and transverse threads having the threads in one layer bonded to those in another layer by means of an adhesive, comprising the steps, of arranging the longitudinal threads in two layers spaced apart, advancing said longitudinal threads continuously, laying transverse threads against the outer face of each layer of longitudinal threads by winding at least one continuous thread around the said layers of longitudinal threads, and effecting an application of an adhesive to the outer face of each layer of longitudinal threads immediately before the transverse threads are laid thereon.

2. A method as defined in claim 1 and including the steps of arranging the longitudinal layers of threads slidably over opposing faces of a stationary former, and applying heat and rolling pressure to the outer face of each assembly of longitudinal and transverse threads while such assemblies are traversed over the former.

3. Process of manufacturing a non-woven fabric, comprising the steps of moving along a predetermined path a layer composed of longitudinal threads arranged next and parallel to each other and extending in the direction of said predetermined path; applying an adhesive to said layer of longitudinal threads during movement thereof along said predetermined path; continually winding, along a path substantially transverse to said predetermined path, at least one transverse thread about said moving layer of longitudinal threads after said adhesive has been applied thereto so that adjacent turns of said wound transverse thread adhere to said layer of longitudinal threads extending adjacent and transverse to the same to constitute a layer of transverse threads forming together with said layer of longitudinal threads, to which they adhere, a non-woven fabric.

4. Process of manufacturing a non-woven fabric, comprising the steps of moving along a predetermined path a layer composed of longitudinal threads arranged next and parallel to each other and extending in the direction of said predetermined path; applying an adhesive to one face of said layer of longitudinal threads during movement thereof along said predetermined path; continually winding, along a path substantially transverse to said predetermined path, at least one transverse thread about said moving layer of longitudinal threads after said adhesive has been applied thereto so that adjacent turns of said wound transverse thread adhere to said layer of longitudinal threads extending adjacent and transverse to the same to constitute a layer of transverse threads forming along their portions which adhere to said layer of longitudinal threads together with the same a non-woven fabric and along their portions which do not adhere free transverse thread portions; and severing said free transverse thread portions from said layer of longitudinal threads.

5. Process of manufacturing a non-woven fabric, comprising the steps of arranging a plurality of longitudinal threads next and parallel to each other so as to form a layer of said longitudinal threads; continually moving said layer along a first path in the direction of the length of said longitudinal threads; applying an adhesive to said layer of longitudinal threads at a first part of said first path; continually moving at least one transverse thread repeatedly along an endless second path extending about said first path along and against one side of said layer of longitudinal threads at a second part of said first path located adjacent to and after said first part of said path in the direction of movement of said layer of longitudinal threads so that said transverse thread will adhere to said layer of longitudinal threads and be carried therewith along said first path to form a non-woven fabric with said layer of longitudinal threads.

6. Process of manufacturing a non-woven fabric, comprising the steps of arranging a plurality of longitudinal threads next and parallel to each other so as to form a layer of said longitudinal threads; continually moving said layer along a first path in the direction of the length of said longitudinal threads; applying an adhesive to said layer of longitudinal threads at a first part of said first path; continually moving a plurality of transverse threads located next to each other respectively and repeatedly along a plurality of endless second paths extending about said first path along and against one side of said layer of longitudinal threads at a second part of said first path located adjacent to and after said first part of said path in the direction of movement of said layer of longitudinal threads so that said transverse threads will adhere to said layer of longitudinal threads and be carried therewith along said first path to form a non-woven fabric with said layer of longitudinal threads.

References Cited in the file of this patent

UNITED STATES PATENTS

| Number | Name | Date |
|---|---|---|
| 939,839 | Himes | Nov. 9, 1909 |
| 1,096,709 | Gillies | May 12, 1914 |
| 1,195,949 | Carney | Aug. 22, 1916 |
| 1,195,951 | Carney | Aug. 22, 1916 |
| 2,015,006 | Ekisler | Sept. 17, 1935 |
| 2,107,067 | Alderfer | Feb. 1, 1938 |
| 2,131,024 | Cordts | Sept. 27, 1938 |
| 2,266,761 | Jackson et al. | Dec. 23, 1941 |
| 2,467,999 | Stephens | Apr. 19, 1949 |
| 2,475,019 | Faris | July 5, 1949 |
| 2,502,514 | Ewer | Apr. 4, 1950 |
| 2,522,527 | Manning | Sept. 19, 1950 |
| 2,542,139 | Holland | Feb. 20, 1951 |
| 2,546,230 | Modigliani | Mar. 27, 1951 |
| 2,609,320 | Modigliani | Sept. 2, 1952 |
| 2,680,469 | Ahier et al. | June 8, 1954 |

FOREIGN PATENTS

| Number | Country | Year |
|---|---|---|
| 17,549 | Great Britain | 1898 |
| 13,430 | Great Britain | 1908 |